United States Patent

[11] 3,609,384

[72] Inventor Charles Strohmeyer, Jr.
 Wyomissing, Pa.
[21] Appl. No. 854,883
[22] Filed Sept. 3, 1969
[45] Patented Sept. 28, 1971
[73] Assignee Electrodyne Research Corporation
 Reading, Pa.

[54] CONTROL MEANS FOR STABILIZING A STEAM-DRIVEN REHEAT-TYPE TURBINE GENERATOR AFTER SUDDEN RUNBACK OF ELECTRIC GENERATION
7 Claims, 1 Drawing Fig.

[52] U.S. Cl. ..................................................... 290/40,
 290/2
[51] Int. Cl. ..................................................... H02p 9/04
[50] Field of Search ........................................... 60/73, 105;
 415/17; 290/2, 40

[56] References Cited
 UNITED STATES PATENTS
2,811,837 11/1957 Eggenberger ................. 60/73
3,060,692 10/1962 Caldwell et al. ............... 60/73
3,069,859 12/1962 Weehuizen .................... 60/73

Primary Examiner—Martin P. Schwadron
Assistant Examiner—Allen M. Ostrager
Attorney—William J. Ruano ABSTRACT: The invention provides a means of minimizing acceleration of a steam-driven reheat-type turbine generator after sudden partial runback of electric generation as a result of stored energy in the turbine driver whereby flow of reheated steam to the reheat turbine through the intercepter valves is controlled as a function of upstream pressure and similarly steam flow to the high pressure turbine is controlled by pressure of said high pressure turbine to regulate electrical output after runback and while simultaneously releasing surplus energy.

PATENTED SEP 28 1971 3,609,384
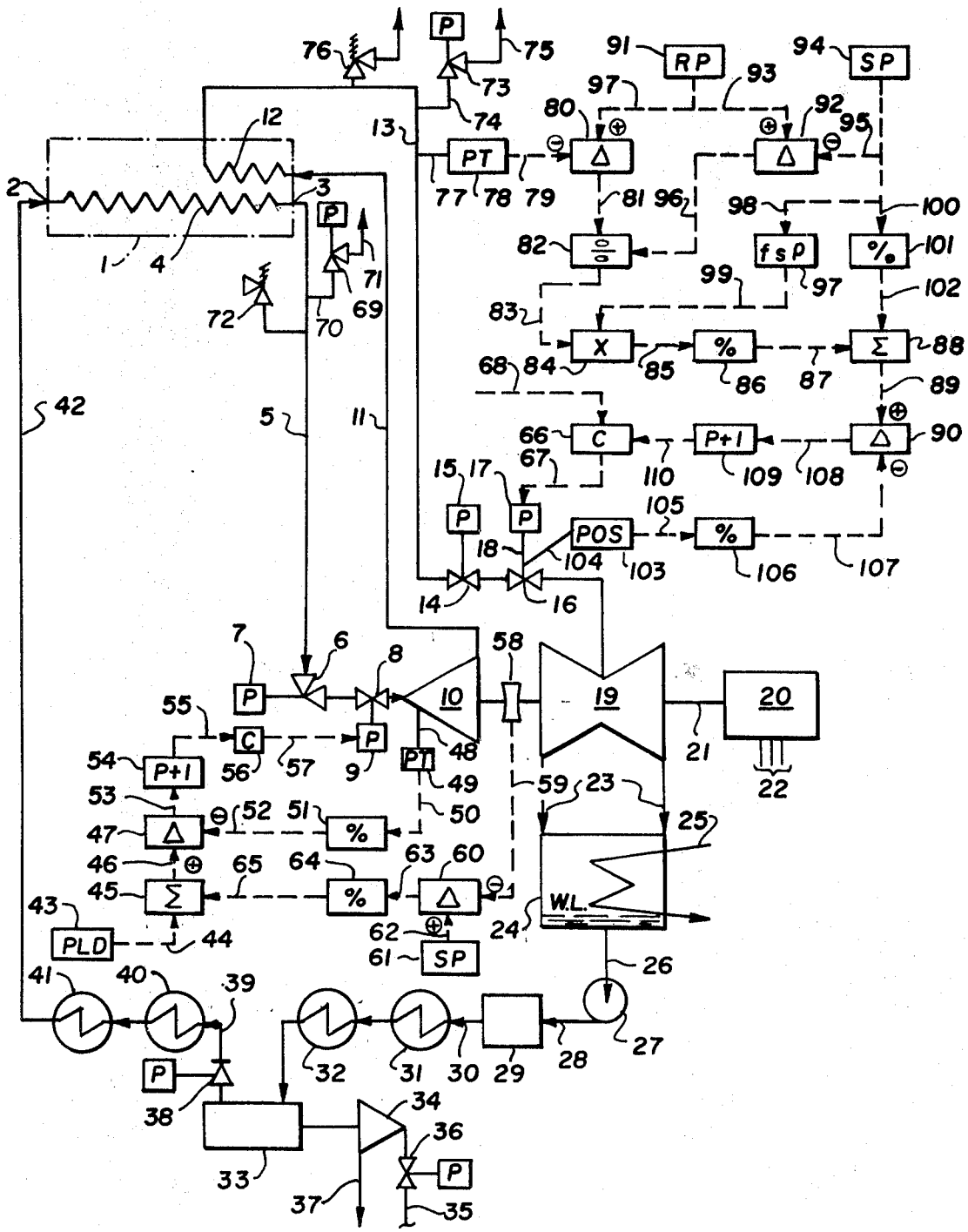
INVENTOR.
CHARLES STROHMEYER JR.
BY
William J. Rosano
his ATTORNEY

CONTROL MEANS FOR STABILIZING A STEAM-DRIVEN REHEAT-TYPE TURBINE GENERATOR AFTER SUDDEN RUNBACK OF ELECTRIC GENERATION

This invention provides a means for improving operation of steam-driven reheat-type turbine generators after sudden partial runback of electric generation. The distribution system connected to the electric generator may be disrupted whereby a large segment of load is suddenly disconnected from the generator's output. Where the turbine generator has been operating near its rated load at time of load separation, considerable energy is stored in the turbine and reheat circuits at the time of load separation. This causes the turbine generator to accelerate rapidly and in the case of an alternating current system the acceleration can cause a phase-angle difference which produces further upset causing a trip and an entire loss of electric generation from the turbine generator. The turbine generator electrical output must at times be runback suddenly and stored within the turbine and reheater dissipated in a controlled manner.

The most effective means of stabilizing power output from the turbine driver after sudden runback is to control the flow of steam to the reheat turbine through the interceptor valves stabily at a constant value. Control of this flow for any desired MW electrical loading after runback can be characterized with steam pressure upstream of the interceptor valves. It is required that the interceptor valves close momentarily on runback after which they can open to a position characterized with upstream pressure for the specific electrical output desired. As a result of coordinating interceptor valve position with upstream pressure, there is no need to rapidly decay reheater pressure which can be accomplished subsequently in a controlled manner.

The high pressure turbine governor valves are actuated to close at least partially in response to loss of system electrical demand. Partial closure of the governor valves will permit reheater cooling as well as dissipate energy from the steam generator especially if an electromatic relief valve is provided at the reheater outlet.

An electromatic relief valve at the superheater outlet upstream of the high pressure turbine governor valves will provide the necessary means to dissipate energy from the steam generator to accommodate the partial runback.

A specific object of this invention is to provide in a steam-electric generating unit including a steam generator connected to a turbine driver through conduit and power-operated first steam flow control valve means, means for extracting partially expanded steam intermediately from said turbine driver, a steam reheater, conduit means for conveying said extraction steam to said reheater, conduit means for conveying reheated steam from said reheater to said turbine driver for continued expansion of said steam in said turbine driver, power-operated second steam flow control valve means incorporated in said last steam conduit means, an electric generator connected to said turbine driver, the invention comprising a load-change-stabilizing control means whereby in the event of a sudden reduction in electrical output from said electric generator said power operator means for said first and said second valve means is responsive to steam pressure variation intermediately between said first and said second valve means.

A further object of this invention is to provide a means after runback to control steam pressure intermediately between said first and said second flow control valve means.

A still further object of this invention is to provide a means after runback to characterize said second flow control valve means with upstream steam pressure.

A still further object of this invention is to provide power-actuated electromatic relief valve capacity from said reheated steam circuits actuated by said sudden reduction in electrical output.

A still further object of this invention is to provide power-actuated electromatic relief valve capacity upstream of said first valve means for use in conjunction with sudden loss of electrical generation.

The invention will be described in detail with reference to the accompanying drawing wherein:

The FIGURE is an overall representation of a steam-electric generating plant illustrating the basic cycle and control components essential to the invention.

In the FIGURE steam generator 1 is provided with feedwater inlet 2, superheater outlet 3 and heat absorption circuits 4 connected therebetween. Conduit 5 connects to superheater outlet 3 and discharges steam to stop valve 6 which is power operated by mechanism 7. Valve 6 discharges to governor valve/s 8 which are power actuated by mechanism 9. Valve/s 8 may be an individual valve or multiple valves which are operated parallelly or sequentially.

Valve/s 8 connect to high pressure turbine 10 and regulate steam flow through the turbine blade path. Turbine 10 discharges through conduit 11 to reheater 12 located in steam generator 1. Reheater 12 could be independent of steam generator 1.

The source of heat input to steam generator 1 and reheater 12 is not shown but could come from the firing of fossil fuels or heat generated from a nuclear process or a combination of both.

Reheated steam from heat exchange surface 12 flows through conduit 13 to stop valve 14 which is power actuated by mechanism 15. Stop valve 14 discharges to interceptor valve/s 16 which are power-actuated by mechanism 17 through valve stem/s 18. Valve/s 16 are normally open when steam flow through valve/s 8 is driving turbine 10. valve/s 16 connect to reheat turbine 19. Turbines 10 and 19 connect to generator 20 through shaft means 21 and provide power to generate electricity in terminals 22.

Turbine 19 exhausts through conduit 23 to condenser 24. Cooling water flowing through circuit 25 condenses steam in 24 which falls as liquid to the bottom of the structure. The condensed liquid flows through conduit 26 to condensate pump 27 which discharges serially through conduit 28, water purification equipment 29, conduit 30 to low pressure heaters 31 and 32 and to the suction of boiler feed pump 33.

Heaters 31 and 32 are of the tube and shell type. Condensate flows through the tubes and extraction steam from turbine 19 is fed to the shells (not shown). The condensed steam in the shells is drawn off and discharged to condenser 24 (not shown).

Pump 33 is driven through shafting means by auxiliary turbine drive 34 which receives extraction steam from main turbine 19 (not shown) through conduit 35 and steam flow control valve 36. Steam from turbine drive 34 exhausts to condenser 24 (not shown) through conduit 37.

Feedwater is discharged from pump 33 through stop check valve 38 and conduit 39 to high pressure heaters 40 and 41. Feedwater from heaters 40 and 41 flows through conduit 42 to feedwater inlet 2.

The feedpump 33 raises the fluid pressure to the working level of the steam generator 1 system. The quantity of feedwater flow to steam generator 1 is regulated by the speed of turbine 34. Speed is controlled by the throttling action of a valve 36 in response to the demand for feedwater flow (not shown).

The normal controls coordinate the heat input and feedwater flow to steam generator 1 and the steam supply to turbine 10 through valve/s 8 to maintain proper steam pressure and temperature at superheater outlet 3 for the required electric generation at terminals 22. The controls for the steam generator are not shown. The demand for electric generation is supplied from controller 43, in this case, an electrical voltage through circuit 44 to summer 45. The output of summer 45 feeds through circuit 46 to difference unit 47.

Steam pressure of a full arc steam admission point of turbine 10 is transmitted through conduit 48 to pressure sensor 49 where steam pressure is measured and converted to the form of a ranged control voltage and transmitted through circuit 50 proportional unit 51 and circuit 52 to difference unit 47. The voltages representative of demand for electric generation (MW) and turbine stage steam pressure are compared in unit 47 as generation and turbine stage steam pressure have a direct linear relationship with each other which is repeatable, as MW demand increases, stage steam pressure increases and vice versa.

The output signal in circuit 53 deviation from a neutral value is representative of valve/s 8 position error. If stage steam pressure is low compared with MW demand, the valve/s 8 must be opened further and vice versa. Circuit 53 connects to proportional and integral controller 54. Controller 54 increases or decreases the signal in output circuit 55 until the error in circuit 53 is zero. Circuit 55 feeds to controller 56. Controller 56 actuates power mechanism 9 through circuit 57 to open valve/s 8 when the voltage in circuit 55 increases and vice versa when the voltage decreases.

Speed-sensing device 58 is associated with turbine-shafting means 21 and measures speed and converts speed to a ranged electric voltage in circuit 59 which connects to difference unit 60. Speed set point voltage is generated in setter 61 and is representative of desired speed which feeds to unit 60 through circuit 62. The output of unit 60 in circuit 63 is speed error. Speed error is ranged in proportional unit 64 with respect to the magnitude of its influence through circuit 65 to summer 45 where the demand for MW from controller 43 is corrected for speed error. If shaft speed is below set point the demand for MW will increase which in turn will open valve/s 8 and vice versa. There in no integral or reset action to correct speed at this point.

Interceptor valve/s 16 are normally open when the turbines 10 and 19 are powering electric generator 20. In the event of a sudden increase in shaft 21 speed and/or an increase of speed above a preset value, such speed increase is sensed by means not shown and transmitted through circuit 68 to controller 66 which in turn connects to power mechanism 17 through circuit 67 to close valve/s 16.

This invention supplements the normal systems as described above at times when there is a sudden partial loss of external electric load at the generator terminals 22. Such loss may occur as a result of a failure in the sending transmission system requiring a rapid decrease in the electrical output of generator 20. The steam stored in the turbine and reheat system downstream of valve/s 8 tends to cause acceleration of shaft 21 speed as partial load on the generator is suddenly disconnected (i.e. MW load drops from 100 to 50 percent of rating). The resultant increase in generator speed causes transmission system instability which may cause complete trip and loss of power from the unit which is undesirable in times of emergency.

Steam storage is related to the phenomenon that turbine stage pressures increase as MW loading of the generator 20 increases. Thus, steam pressure in reheater 12 operating at 100 percent of rating is twice the steam pressure when operating at 50 percent of rating. The mass of steam entrained in the system is a function of pressure. In the past it has not been possible to decrease the power output of turbines 10 and 19 instantaneously by 50 percent under controlled conditions to accommodate required electrical output from generator 20.

Braking resistors connected to terminals 22 have been suggested to permit dissipation of steam energy without overspeeding generator 20. Such resistors are expensive, can only be used economically for a moment of time (i.e. less than 1 second) and do not match stored energy requirements of the steam system. Thus, fast valving (closure of valves 8 and 16) was recommended in conjunction with the use of braking resistors. Fast valving requires a tremendous energy dump from the steam generator, particularly if it is to continue in operation carrying partial load, while heat input and waterflow are cut back to accommodate the new loading condition.

The present invention overcomes past difficulties in that steam storage problems within the turbine, reheat systems and steam generator are minimized.

Approximately 25 percent of the recoverable work from steam expansion is performed upstream of valve/s 16 and 75 percent downstream. Flow of steam to turbine 19 through valve/s 16 is a function of valve position (port area), upstream pressure and pressure drop across the valves. In the event of a sudden fast runback of electrical load (i.e. 100 to 50 percent of rating) it is desirable to stabilize electric generation immediately following the runback at nearly constant speed. This can be done by stabilizing the flow of steam to reheat turbine 19 without transfer of load control from valve/s 8 to valves 16.

Power-actuated steam relief valve 69 is connected to conduit 5 through conduit 70 and discharges to atmosphere through conduit 71. Conduit 71 could alternatively connect to condenser 24 at greater expense to reduce cycle water loss. Valve 69 may be sized for substantial capacity (i.e.: 30 percent of line 5 rating). Opening of valve 69 prior to the opening of conventional spring loaded safety valve 72 saves wear and tear on valve 72.

Power-actuated steam relief valve 73 is connected to conduit 13 through conduit 74 and discharges to atmosphere through conduit 75. Conduit 75 could alternatively connect to condenser 24 at greater expense to reduce cycle water loss. Valve 73 may be sized similarly to valve 69. Opening of valve 73 prior to conventional spring-loaded safety valve 76 saves wear and tear on valve 76.

The degree of a sudden runback of electrical load at terminals 22 may be sensed independently of acceleration in a half cycle in the case of 60 cycle/sec. AC generation by means not shown. This means triggers the instantaneous closing of valve/s 16 through circuit 68, controller 66, circuit 67 to actuate power mechanism 17. After a short interval of time (i.e.:½ to 1 second), valve/s 16 open a predetermined amount as a function of upstream pressure as in conduit 13 to hold the flow of steam to turbine 19 within a range to produce approximately the desired MW output from generator 20. The pressure downstream of and flow quantity through valve/s 16 are fixed values for any desired MW output. Thus, valve/s 16 may be positioned as a function of upstream pressure to produce the required steam flow to turbine 19. This eliminates the need to transfer load control from valve/s 8 to valve/s 16.

The use of upstream pressure for the control of valve/s 16 position provides stability in that the reheater system serves as an accumulator and lengthens the time constant of the control process. Thus, the control interaction between valves 8 and 16 can be minimized.

In FIG. 1, conduit 77 conveys conduit 13 pressure to sensor 78 where steam pressure is measured and converted to the form of a ranged control electric voltage and transmitted through circuit 79, difference unit 80, circuit 81, division relay 82, circuit 83, ratio relay 84, circuit 85, proportional relay 86, circuit 87, summer 88, circuit 89 to difference relay 90. The signal in circuit 89 is the set point for valve/s 16 port area.

Reference controller 91 generates a signal representative to conduit 13 pressure at maximum steam flow. This signal connects to difference unit 92 through circuit 93. Setter 94 generates a voltage proportional with desired end point MW electrical loading after runback. This signal feeds to difference unit 92 through circuit 95. The input from circuit 95 is subtracted from the input from circuit 93 in unit 92. The output from unit 92 in circuit 96 is a representative measure of the range of differential pressure possible across valve/s 16.

The reference signal from controller 91 feeds to difference unit 80 through circuit 97. The input from circuit 79 is subtracted from the input from circuit 97 in unit 80. The output from unit 80 in circuit 81 is a representative inverse measure of the required pressure differential to be maintained across valve/s 16. The signal in circuit 81 is divided by the signal in circuit 96 in division relay 82. The output in circuit 83 is the inverse of the desired differential across valve/s 16 as a fraction of the possible pressure range.

The signal from circuit 83 is shaped in ratio relay 84 to approximate the proper square root function for each runback end point loading value. The signal from setter 94 feeds to function generator 97 through circuit 98. Function generator 97 develops the appropriate scalar value in circuit 99 for multiplication with the input circuit 83 in relay 84. The output signal from relay 84 in circuit 85 is gained to a working range of the system in proportional relay 86 to approximately serve as a set point for valve/s 16 required port area.

The output of relay 86 feeds to summer 88 through circuit 87. The signal is compensated in summer 88 by a signal from setter 94 through circuit 100 to proportional relay 101 and through circuit 102 to summer 88. The signal from 94 is gained down in unit 101 so that a small open bias proportional to runback end point MW electrical loading is added to the output signal in circuit 89. This characterizes the valve/s 16 position for maximum pressures in conduit 13.

Valve stem 18 or valves valve/s position is transmitted to position transmitter 103 through linkage 104. Linkage 104 is provided with a standard cam mechanism (not shown) so that the output of the cam mechanism is linear with changes in valve port area. Position transmitter 103 converts the corrected valve position (linearized for port area change) to the form of a ranged control voltage which is transmitted through circuit 105 to proportional relay 106. Relay 106 permits coordination of the signal range with the requirements of relay 90. Relay 106 connects to relay 90 through circuit 107.

The signal from setter 94 may be fixed for various load conditions after runback or may be variable to suit any degree of runback required. The output from setter 94 is coordinated with the runback valve/s 8 (not shown).

Difference unit 90 compares the set point for valve/s 16 port area in circuit 89 with actual port area in circuit 107. The output in circuit 108 is the valve/s 16 port area error. This error feeds proportional and integral relay 109 wherein the signal output in circuit 110 is increased (error positive) or decreased (error negative) until there is no error in circuit 108. Circuit 110 feeds to controller 66 which actuates power mechanism 17 for valve/s 16. Valves 16 open in response to an increasing signal in circuit 110 and vice versa.

Thus, provision is made after runback and the momentary complete closure of valve/s 16 to control valve/s 16 in a manner which produces a constant quantity of steam flow to turbine 19 for stabilizing MW electrical loading at some predetermined value after runback.

Where the electrical output in terminals 22 is substantial after runback, i.e.: one-half of rating, there is little probability for acceleration of the unit developing from energy stored within the high pressure turbine after the initial regulation of valve/s 8 for the new load condition. Thus, there is no need for instantaneous decay of reheater pressure in the case where valve/s 16 are regulating steam flow to turbine 19.

Where electromatic relief valve 73 is furnished having substantial capacity i.e.: one-third of rated flow, it is not essential that valve/s 8 be fully closed to accommodate the runback. Valve 73 may be popped open in response to runback and valve/s 8 closed immediately to a range where they will pass slightly less flow than can be passed through valve 73 and accommodated by accumulation within the reheater without popping valve 76 open. The partial flow through valve/s 8 will not create work in turbine 10 in excess of the runback load requirement and at the same time will provide cooling of the reheater and will relieve the boiler of surplus energy while cutting back to the new reduced loading condition. After runback, when valve/s 16 open, valve/s 8 can be regulated to pass slightly less flow than can be passed through valves 73 and 16 while stabilizing decaying pressure in the reheater to the working level of turbine 19 and where valve/s 16 are wide open. Means for actuating valve 73 in response to a runback are not shown but are available from conventional known practice.

During a runback valve/s 8 are positioned as required by changing the output demand from controller 43 in response to runback. Controller 43 may be programmed to suit any required parameter vs. time; also, controller 43 may be coordinated with the movement of valve/s 16 immediately following a runback (not shown).

Runback can be initiated from opening of circuit breakers in the power sending system connected to terminals 22, rate action units associated with current measuring devices for the output of terminals 22 or at the load center to which terminals 22 feed, or differential relays within the electrical system. Initiation of the runback is not part of this invention. The invention specifically relates to what happens after the runback is initiated.

In the case where valve 69 is included and is sized for substantial capacity, i.e.: one-third of rating, energy accumulated within the steam generator can be immediately relieved downstream of superheater outlet 3 and upstream of turbine 10 by opening valve 69 in response to runback. This coupled with relief through valve 73 permits the steam generator to be safely unloaded with respect to reduction in feed waterflow, heat input and thermal storage.

Thus, it will be seen that I have provided an efficient embodiment of my invention whereby a means is provided to regulate steam flow to a reheat turbine driving an electric generator after a sudden reduction in electrical load responsive to upstream steam pressure, wherein the upstream high pressure steam-turbine-governing valves are responsive to sudden reduction in electrical load, are responsive to downstream steam pressure and limit the flow of steam to the high pressure turbine as can be consumed in said reheat turbine plus any steam relief capacity of a power-actuated type responsive to sudden reduction in electrical load which may be provided for the reheat steam system and wherein steam relief capacity of a power-actuated type responsive to sudden reduction in electrical load dissipates surplus energy from the steam generator at time of load reduction.

While I have illustrated and described several embodiments of my invention, it will be understood these are by way of illustration only, and that various changes and modifications may be made within the contemplation of my invention and within the scope of the following claims: I claim:

1. In a steam-electric generating unit including a steam generator connected to a turbine driver through conduit and first steam flow control valve means, means for extracting partially expanded steam intermediately from said turbine driver, a steam reheater, conduit means for conveying said extraction steam to said reheater, conduit means for conveying said extraction steam to said reheater, conduit means for conveying reheated steam from said reheater to said turbine driver for continued expansion of said steam in said turbine driver, second steam flow valve means incorporated in said last steam conduit means, power-operated means for said first and said second control valve means, an electric generator connected to said turbine driver; the invention comprising control means including means for sensing and measuring (a) steam pressure intermediately between said first and said second valve means and (b) fast reduction of electrical output from said electric generator, said control means being adapted to stabilize steam flow in said turbine driver downstream of said second valve means following a measured fast reduction in electrical output, said power-operated means being adapted to open and close said first and said second valve means in response to said control means from variations in said intermediately measures steam pressure, said response being initiated by said measured fast reduction in electrical output from said electric generator.

2. Control means as recited in claim 1 wherein said means for sensing and measuring steam pressure intermediately between said first and said second valve means comprises a single measuring point for controlling the action of both said first and said second valve means.

3. Control means as recited in claim 1 wherein said means for sensing and measuring steam pressure intermediately between said first and said second valve means comprises a separate measuring point for controlling the action of each of said first and said second valve means.

4. Control means as recited in claim 1 including means to regulate steam pressure at a point intermediately between said first and said second valve means and to a preset parameter through actuation of said power-operated first steam flow control valve means following said measured fast reduction in electrical output from said electric generator.

5. Control means as recited in claim 1 including means to position said power-operated second steam flow control valve means to a preset parameter in response to (a) said steam pressure measurement intermediately between said first and said second valve means and (b) desired load setpoint following said measured fast reduction in electrical output from said electric generator.

6. Control means as recited in claim 1 including power actuated steam relief valve means for drawing steam away from said conduit means upstream of said first valve means responsive to said measured fast reduction in electrical output from said electric generator.

7. Control means as recited in claim 1 including power-actuated steam relief valve means connected to the steam flow path between said first and said second valve means responsive to said measured fast reduction in electrical output from said electric generator.